Dec. 4, 1951     P. H. OPPEGAARD     2,577,264
TRACTOR OPERATED STRAW SWEEPER

Filed Dec. 28, 1949     2 SHEETS—SHEET 1

Parnell H. Oppegaard
INVENTOR.

BY *Clarence A. O'Brien
and Harvey B. Jacobson*
Attorneys

Dec. 4, 1951  P. H. OPPEGAARD  2,577,264
TRACTOR OPERATED STRAW SWEEPER
Filed Dec. 28, 1949  2 SHEETS—SHEET 2
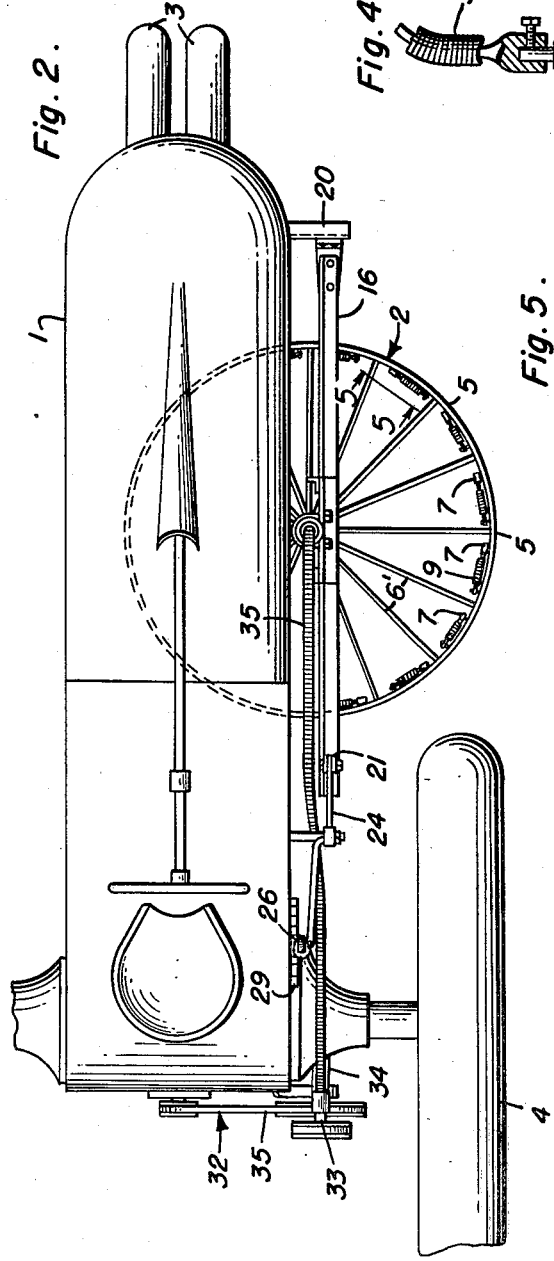
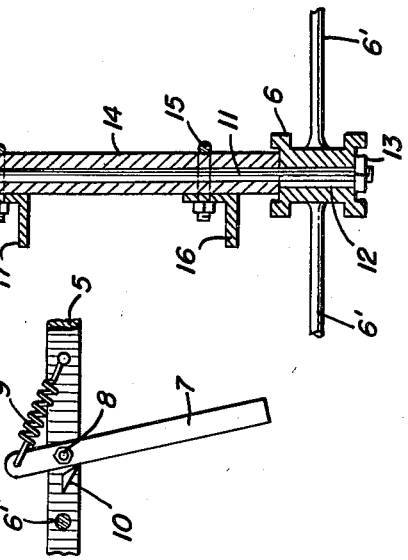
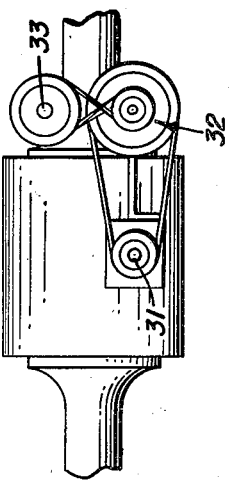
Parnell H. Oppegaard
INVENTOR.

Patented Dec. 4, 1951

2,577,264

UNITED STATES PATENT OFFICE 2,577,264

TRACTOR OPERATED STRAW SWEEPER

Parnell H. Oppegaard, McIntosh, Minn.

Application December 28, 1949, Serial No. 135,327

1 Claim. (Cl. 56—27)

My invention relates to improvements in tractor operated straw sweepers for use in the field in tractor plowing.

The primary object of my invention is to equip the conventional farm tractor with means of simple form for use when plowing with the tractor to sweep loose straw and the like into one furrow in advance of the plow for covering when the next furrow is plowed.

Another object is to provide means of the character and for the purpose set forth adapted for mounting on the conventional farm tractor without necessitating any change in the basic structure of the tractor, and which is not liable to get out of order from prolonged use, and requires a minimum of servicing.

Other and subordinate objects, within the purview of my invention, together with the precise nature of my improvements will be readily understood when the succeeding description and claims are read with reference to the drawings accompanying and forming part of this specification.

In said drawings:

Figure 2 is a view in plan;

Figure 3 is a fragmentary view in rear elevation illustrating the drive from the power take-off of the tractor drawn to a larger scale;

Figure 4 is a fragmentary view in vertical section taken on the line 4—4 of Figure 1 and drawn to a larger scale;

Figure 5 is a detail view in horizontal section taken on the line 5—5 of Figure 2 and drawn to a larger scale.

Figure 1:
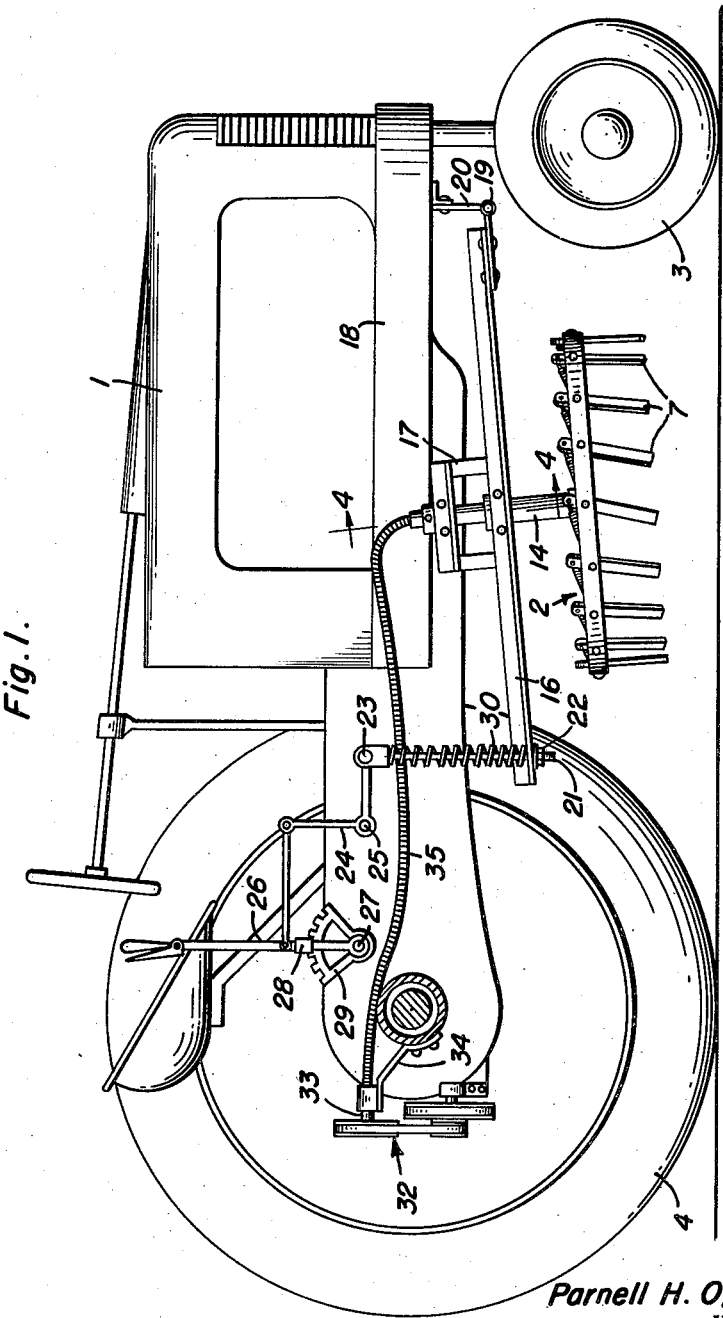
Figure 1 is a view in side elevation of my invention in the preferred embodiment thereof.

Referring to the drawings by numerals, according to my invention, the conventional farm tractor 1 is equipped with a rotary, circular sweeper head 2 disposed horizontally between the front steering wheels 3 and the rear traction wheels 4.

The sweeper head 2, in the embodiment shown, comprises an annular, flat rim 5 connected to a hub 6 by spokes 6'. Sweeper fingers, or tines, 7 spaced circumferentially around the rim 5, equidistantly, depend therefrom and are pivoted, as at 8, contiguous the upper ends thereof to the inner face of said rim 5 to swing rearwardly relative to the direction of rotation of said head 2, for a purpose presently seen. Coil springs 9 suitably connected, as shown in Figure 5, to said fingers 7 above the pivots 8, and to the rim 5 tension the sweeper fingers 7 against such swinging. Stop bosses 10 on the rim 5 establish a normal position of the sweeper fingers 7 under the urge of the coil springs 9 so that said fingers incline from the rim 5 downwardly and rearwardly relative to the direction of rotation of said sweeper head 2.

A mounting for the sweeper head 2 is provided comprising an upright driven shaft 11 on the lower end of which the hub 6 is keyed, as at 12, and retained by a nut 13. The driven shaft 11 is rotatably mounted in an upright sleeve 14 secured by U-bolts 15 to a head carrying bar 16 and to a stabilizing frame 17 rising from said bar 16.

The head carrying bar 16 extends horizontally, longitudinally along the right hand side of the tractor frame 18 with a front end pivoted, as at 19, on a lateral bracket 20 on said frame 18. The head carrying bar 16 is pivoted, as described, for vertical swinging adjustment to vary the plane in which the sweeper head rotates, for a purpose presently seen, and the mounting for said head 2 further comprises the following means for vertically adjusting said bar 16.

An upright hanger rod 21 extends through the rear end of said bar 16 with a retaining nut 22 for said bar on the lower end of said rod. The upper end of the hanger rod 21 is pivoted, as at 23, to one end of a bell crank lever 24, pivoted, as at 25, on the tractor 1 for vertical rocking movement. An upright hand lever 26 pivoted on the tractor 1, as at 27, is operatively connected to the bell crank lever 24 with the usual detent 28 on the hand lever for engagement with the usual detent segment 29 suitably fixed on the tractor 1.

The described mounting for the sweeper head 2 is designed to support said head at the right hand side of the tractor 1 so that as the head rotates a segment thereof overhangs the path of travel of the right hand traction wheel 4 whereby the sweeper fingers 7 are revolved in a circular path across and lengthwise of said path of travel of the right hand traction wheel 4 and forwardly of said wheel. Thus, if the right hand rear traction wheel 4 is traveling in a plowed furrow, the sweeper head 2 will be rotated over the furrow and the sweeper fingers 7 revolved over the furrow in advance of said rear wheel.

The head carrying bar 16 is designed to be vertically adjusted so that when the right hand traction wheel 4 is traveling in a furrow, not shown, said head 2 is tilted upwardly and forwardly so that the sweeper fingers 7 in the rear of said head engage the ground for sweeping straw off the ground into the furrow, whereas, the remaining sweeper fingers clear the ground to obviate sweeping of straw away from the furrow.

To prevent breakage, the head carrying bar 16 is vertically slidable on the hanger 21 in opposition to a coil spring 30 on said rod so that the sweeper head 2 and said bar 16 may yieldingly swing upwardly on the pivot 19 to ride over obstructions in the field.

A drive is provided between the power take-off shaft 31 of the tractor 1 and the driven shaft 11 and which comprises the following: A speed reducing belt and pulley drive 32 between the power take-off shaft 31 and a stub shaft 33 provides for driving said stub shaft in a suitable bearing bracket 34 on the tractor 1. A flexible driving shaft 35 operatively connects the stub shaft 33 to the upper end of the driven shaft 11.

The operation of my invention will be readily understood. With the sweeper head 22 properly adjusted vertically, and in plowing with a plow, not shown, drawn by the tractor 1, the right hand rear traction wheel 4 is caused to track in a plowed furrow while a succeeding furrow is being plowed. Thus the sweeper head 2 is carried over the field, not shown, in advance of said wheel 4. With the power take-off shaft 31 operating, under the usual control, not shown, to drive the sweeper head counterclockwise as viewed in Figure 2, the sweeper fingers will sweep straw, and the like from the ground, into the plowed furrow to be packed therein by the right hand rear traction wheel 4 for subsequent covering by the plow as the next furrow is being plowed. As the sweeper fingers 7, at the rear of the sweeper head 2, operate in engagement with the ground, said fingers swing rearwardly, with respect to the direction in which the same are being revolved, to drag over the ground with a sweeping action and yield upwardly to compensate for uneven ground. Obviously, by vertical adjustment of the head carrying bar 16, in the manner described, the plane in which the sweeper head rotates may be varied to vary the number of sweeper fingers 7 which will engage the ground. The sweeper head 2 and the head carrying bar 16 will swing upwardly in opposition to the coil springs 30, as said head moves forwardly, to compensate for uneven ground and permit the sweeper head to ride over obstructions.

The foregoing will, it is believed, suffice to impart a clear understanding of my invention, without further explanation.

Manifestly, the invention, as described, is susceptible of modifications, without departing from the inventive concept, and right is herein reserved to such modifications as fall within the scope of the appended claim.

Having described my invention, what is claimed as new is:

The combination with a tractor having a rear ground wheel on one side thereof adapted to travel in a plowed furrow, said tractor having a power take-off, of a bar extending longitudinally of the tractor along said side thereof with a front end pivotally connected to said tractor for vertical swinging adjustment of the bar, a ground sweeper head having a circular series of ground sweeper teeth depending therefrom, means rotatably suspending said head from said bar for rotation about a vertical axis to revolve said series of teeth cross-wise of said furrow to sweep material into the furrow for packing by said wheel, said head being tiltable by adjustment of said bar to revolve the teeth successively into engagement with the ground to sweep toward the furrow solely, a drive between said power take-off and said head including a flexible connection compensating for tilting of said head relative to said power take-off, a hand lever on said tractor, and means operatively connecting said lever to the other end of said bar to adjust said bar.

PARNELL H. OPPEGAARD.

REFERENCES CITED

The following references are of record in the file of this patent:

UNITED STATES PATENTS

| Number | Name | Date |
|---|---|---|
| 333,917 | Brown | Jan. 5, 1886 |
| 391,484 | Palmer | Oct. 23, 1888 |
| 1,426,989 | Jones et al. | Aug. 22, 1922 |
| 2,064,480 | Lock et al. | Dec. 15, 1936 |
| 2,265,405 | Stantz | Dec. 9, 1941 |

FOREIGN PATENTS

| Number | Country | Date |
|---|---|---|
| 16,403 | Great Britain | July 17, 1911 |